(12) United States Patent
Hoshino (10) Patent No.: US 10,465,881 B2
(45) Date of Patent: Nov. 5, 2019

(54) LIGHTING TOOL FOR VEHICLE

(71) Applicant: STANLEY ELECTRIC CO., LTD., Tokyo (JP)

(72) Inventor: Shinya Hoshino, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 16/030,478

(22) Filed: Jul. 9, 2018

(65) Prior Publication Data

US 2019/0017681 A1    Jan. 17, 2019

(30) Foreign Application Priority Data

Jul. 14, 2017   (JP) .................................. 2017-138348

(51) Int. Cl.

| | |
|---|---|
| *F21V 1/00* | (2006.01) |
| *F21V 14/00* | (2018.01) |
| *F21S 41/135* | (2018.01) |
| *F21S 41/25* | (2018.01) |
| *G02F 1/29* | (2006.01) |
| *F21S 41/60* | (2018.01) |
| *B60Q 1/14* | (2006.01) |
| *F21S 41/20* | (2018.01) |
| *F21S 41/255* | (2018.01) |
| *F21S 41/64* | (2018.01) |

(Continued)

(52) U.S. Cl.
CPC ............ *F21V 14/003* (2013.01); *B60Q 1/143* (2013.01); *F21S 41/135* (2018.01); *F21S 41/25* (2018.01); *F21S 41/255* (2018.01); *F21S 41/285* (2018.01); *F21S 41/60* (2018.01); *F21S 41/645* (2018.01); *G02F 1/29* (2013.01); *F21W 2102/13* (2018.01); *G02F 2203/12* (2013.01); *G06K 9/00791* (2013.01)

(58) Field of Classification Search
CPC .......... F21S 41/135–41/16; F21S 41/25; F21S 41/60; F21S 41/64–41/645; F21V 14/003; F21W 2102/13; G02F 1/29; G02F 2203/12; G06K 9/00791
USPC ......................... 362/509, 538–539, 543–545
See application file for complete search history.

(56) References Cited

U.S. PATENT DOCUMENTS

| | | | |
|---|---|---|---|
| 2015/0191115 A1 | 7/2015 | Yamamura et al. | |
| 2017/0043705 A1* | 2/2017 | Mizuno | ................... F21S 41/25 |

FOREIGN PATENT DOCUMENTS

| | | |
|---|---|---|
| JP | H06-191346 A | 7/1994 |
| WO | 2014/002630 A1 | 1/2014 |

* cited by examiner

*Primary Examiner* — Jason M Han
(74) *Attorney, Agent, or Firm* — Keneally Vaidya LLP (57) ABSTRACT

A lighting tool for a vehicle includes a light source device, and a first projection module and a second projection module each configured to radiate light radiated from the light source device toward a front of the vehicle as a light distribution pattern, wherein the light source device radiates light toward each of the first projection module and the second projection module, the first projection module and the second projection module each include a liquid crystal element that modulates the light radiated from the light source device to form an image light, and a projection optical system that radiates the image light forward as the light distribution pattern, and the light distribution pattern of the first projection module and the light distribution pattern of the second projection module overlap with each other over an entire projection range in a direction of a first axis.

7 Claims, 6 Drawing Sheets

(51) Int. Cl.
*F21W 102/13* (2018.01)
*G06K 9/00* (2006.01)

LIGHTING TOOL FOR VEHICLE

CROSS-REFERENCE TO RELATED APPLICATION

Priority is claimed on Japanese Patent Application No. 2017-138348, filed Jul. 14, 2017, the content of which is incorporated herein by reference.

BACKGROUND

Field of the Invention

The present invention relates to a lighting tool for a vehicle.

Description of Related Art

In a lighting tool for a vehicle, a technology of changing an illuminance distribution or an irradiation range of a light distribution pattern according to an ambient environment or road conditions is required.

Japanese Unexamined Patent Application, First Publication No. H06-191346 discloses a technology of radiating a predetermined light distribution pattern toward a road in front by using an optical shutter such as a liquid crystal element or the like.

In addition, PCT International Publication No. 2014/002630 discloses a lighting tool for a vehicle capable of obtaining a light distribution pattern of a desired illuminance distribution by irradiating different regions of one digital mirror device (DMD) with light from a plurality of light sources, and radiating and superimposing the light reflected by the DMD toward the front side by using a projection optical system.

SUMMARY OF THE INVENTION

In the configuration of PCT International Publication No. 2014/002630, light needs to be accurately condensed toward the DMD in which an area of a reflective surface is limited, and therefore there is a problem so that the optical system becomes complicated. Here, in the configuration of PCT International Publication No. 2014/002630, it is conceivable to obtain a light distribution pattern having an illuminance distribution by replacing the DMD with a liquid crystal element. However, in such case, while the above-mentioned problem can be solved by sufficiently increasing the size of the liquid crystal element, the projection optical system needs to be increased in size, and there is a problem so that the overall dimensions of the lighting tool for a vehicle becomes enlarged. In addition, when light from a plurality of light sources enters one liquid crystal element, there is also concern that the temperature of the liquid crystal element may increase and a phase of a liquid crystal may change to an isotropic phase.

An aspect of the present invention is directed to providing a lighting tool for a vehicle having high reliability capable of easily realizing various light distribution patterns while enlargement of dimensions is minimized.

A lighting tool for a vehicle of an aspect of the present invention includes a light source device; and a first projection module and a second projection module each configured to radiate light radiated from the light source device toward a front of the vehicle as a light distribution pattern, wherein the light source device radiates light toward each of the first projection module and the second projection module, the first projection module and the second projection module each include: a liquid crystal element that modulates the light radiated from the light source device to form an image light; and a projection optical system that radiates the image light forward as a light distribution pattern, and the light distribution pattern of the first projection module and the light distribution pattern of the second projection module overlap with each other over an entire projection range in a direction of a first axis.

According to the above-mentioned lighting tool for a vehicle, the first projection module and the second projection module each have the liquid crystal element and the projection optical system, and the light distribution pattern of the first projection module and the light distribution pattern of the second projection module are configured to overlap with each other.

For this reason, the illuminance of each part of the irradiation region can be varied greatly because the illuminance can be increased by overlapping the plurality of light distribution patterns while the shape of the irradiation region of the lighting tool for a vehicle can be changed by the liquid crystal elements.

Accordingly, various light distribution patterns having different shapes and illuminances can be formed.

In addition, since the first projection module and the second projection module each have a liquid crystal element and a projection optical system, it is possible to provide a lighting tool for a vehicle having an overall compact structure without an increase in size of the liquid crystal elements and the projection optical system. In addition, since the light from the plurality of light sources does not enter one liquid crystal element, it is possible to provide a lighting tool for a vehicle having high reliability while preventing a phase change of the liquid crystal due to an increase in temperature of the liquid crystal elements.

Moreover, since the entire projection ranges of the light distribution patterns of both of the projection modules in the direction of first axis overlap with each other, the first projection module and the second projection module are easily configured to have the same configuration, and for example, the same projection optical system can be used. For this reason, sharing of parts can be achieved, and light distribution patterns having the same shape and different illuminances can be formed with several types of components. Accordingly, it is possible to provide the lighting tool for a vehicle capable of realizing various light distribution patterns with an inexpensive configuration.

In addition, according to the above-mentioned configuration, it is possible to provide the lighting tool for a vehicle having a compound-eye lighting tool in which two projection optical systems or more are disposed and which has better design with respect to a single-eye lens having one projection optical system.

A lighting tool for a vehicle of another aspect of the present invention includes a light source device; and a first projection module and a second projection module each configured to radiate light radiated from the light source device toward a front of the vehicle as a light distribution pattern, wherein the light source device radiates light toward each of the first projection module and the second projection module, the first projection module and the second projection module each include: a liquid crystal element that modulates the light radiated from the light source device to form an image light; and a projection optical system that radiates the image light forward as the light distribution pattern, and the light distribution pattern of the first projection module and the light distribution pattern of the second projection module overlap with each other while respective projection range are deviated from one another in a direction of a first axis.

According to the above-mentioned lighting tool for a vehicle, since the projection ranges of the light distribution pattern of the first projection module and the light distribution pattern of the second projection module in a direction of a first axis are deviated from each other and are partially overlapped with each other, a region having a high illuminance and a region having a low illuminance are formed on the overall light distribution pattern of the lighting tool for a vehicle, and many light distribution patterns can be formed.

For this reason, even when the first projection module and the second projection module have the same configuration, many light distribution patterns can be formed. Accordingly, more light distribution patterns can be formed with fewer types of components by making the parts common. In addition, since the first projection module and the second projection module each have the liquid crystal element and the projection optical system, it is possible to provide the lighting tool for a vehicle having a compact structure as a whole without an increase in size of the liquid crystal element and the projection optical system. In addition, since the light from the plurality of light sources does not enter the one liquid crystal element, it is possible to provide the lighting tool for a vehicle having high reliability while preventing a phase change of the liquid crystal due to an increase in temperature of the liquid crystal element.

In addition, according to the above-mentioned configuration, it is possible to provide the lighting tool for a vehicle having a compound-eye lighting tool in which two projection optical systems or more are disposed and which has better design with respect to a single-eye lens having one projection optical system.

A lighting tool for a vehicle of another aspect of the present invention includes a light source device; and a first projection module and a second projection module each configured to radiate light radiated from the light source device toward a front of the vehicle as a light distribution pattern, wherein the light source device radiate light toward each of the first projection module and the second projection module, the first projection module and the second projection module each include: a liquid crystal element that modulates the light radiated from the light source device to form an image light; and a projection optical system that radiates the image light forward as the light distribution pattern, and a projection range of the light distribution pattern of the first projection module in a direction of a first axis includes a projection range of the light distribution pattern of the second projection module in the direction of the first axis.

According to the above-mentioned lighting tool for a vehicle, since the projection range of the light distribution pattern of the first projection module in the direction of a first axis includes the projection range of the light distribution pattern of the second projection module in the direction of the first axis, the illuminance of the part of the light distribution pattern formed by the first projection module can be increased and the illuminance of the other part can be decreased. In addition, since the first projection module and the second projection module each have the liquid crystal element and the projection optical system, it is possible to provide the lighting tool for a vehicle having a compact structure as a whole without an increase in size of the liquid crystal element and the projection optical system. In addition, since the light from the plurality of light sources does not enter the one liquid crystal element, it is possible to provide the lighting tool for a vehicle having high reliability while preventing a phase change of the liquid crystal due to an increase in temperature of the liquid crystal element.

In addition, according to the above-mentioned configuration, it is possible to provide the lighting tool for a vehicle having a compound-eye lighting tool in which two projection optical system or more are disposed and which has better design with respect to a single-eye lens having one projection optical system.

A lighting tool for a vehicle of another aspect of the present invention includes a light source device; and a first projection module and a second projection module each configured to radiate light radiated from the light source device toward a front of the vehicle as a light distribution pattern, wherein the light source device radiate light toward each of the first projection module and the second projection module, the first projection module and the second projection module each include: a liquid crystal element that modulates the light radiated from the light source device to form an image light; and a projection optical system that radiates the image light forward as the light distribution pattern, the light distribution patterns of the first projection module and the second projection module are laterally asymmetrical with respect to a front surface of the vehicle, and a projection range of the light distribution pattern of the first projection module in a horizontal direction includes a projection range of the light distribution pattern of the second projection module in the horizontal direction.

According to the above-mentioned lighting tool for a vehicle, the light distribution patterns of the first and second projection modules are disposed closer to one side in the horizontal direction. In general, when the lighting tool for a vehicle is mounted on a vehicle, the light emitted from the vicinity of the end portion on the inward side in the vehicle is likely to be obstructed by other members (a body, decoration parts of the lighting tool for a vehicle, and so on). According to the above-mentioned configuration, since a complex light distribution pattern that is laterally asymmetric is formed, the radiated light can be effectively used by narrowing the light distribution angle on the inward side in the vehicle (the left side) that is likely to be obstructed by other members.

In addition, since a pair of lighting tools for a vehicle, each of which is the above-mentioned lighting tool for a vehicle, having the complex light distribution pattern that is laterally inverted, are mounted on both of left and right sides of the headlight of the vehicle, an orientation pattern that is laterally symmetrical can be realized by the pair of left and right lighting tools for a vehicle.

In addition, since the first projection module and the second projection module each have the liquid crystal element and the projection optical system, it is possible to provide the lighting tool for a vehicle having a compact structure as a whole without an increase in size of the liquid crystal element and the projection optical system. In addition, since the light from the plurality of light sources does not enter the one liquid crystal element, it is possible to provide the lighting tool for a vehicle having high reliability while preventing a phase change of the liquid crystal due to an increase in temperature of the liquid crystal element.

In addition, according to the above-mentioned configuration, it is possible to provide the lighting tool for a vehicle having a compound-eye lighting tool in which two projection optical systems or more are disposed and which has better design with respect to a single-eye lens having one projection optical system.

In the above-mentioned lighting tool for a vehicle, the light source device may include: a light source main body; and a polarization beam splitter that reflects light radiated from the light source main body as first polarized light, and that allows the light to pass therethrough as second polarized light having a polarization direction perpendicular to that of the first polarized light, the first projection module may modulate the first polarized light reflected by the polarization beam splitter in the liquid crystal element as the image light and radiate the image light forward as the light distribution pattern in the projection optical system, and the second projection module may modulate the second polarized light passing through the polarization beam splitter in the liquid crystal element as the image light and radiate the image light forward as the light distribution pattern in the projection optical system.

According to the above-mentioned lighting tool for a vehicle, since the light radiated from the one light source main body branches off and is used, the number of light source main bodies can be reduced, and the lighting tool for a vehicle can be reduced in size. In addition, since the light can be divided into the first polarized light and the second polarized light by the polarization beam splitter, the image light can be formed by the liquid crystal element using the polarized light. That is, in the liquid crystal elements of the first projection module and the second projection module, the polarizing plate on the incident side can be omitted, the efficiency of utilization of light can be increased, and reduction in costs can be achieved.

In the above-mentioned lighting tool for a vehicle, an object detection part that detects an object present in front of the vehicle; and a controller that controls the liquid crystal element and form the light distribution pattern of the first projection module and the light distribution pattern of the second projection module on the basis of detection circumstances of the object detection part may be provided.

According to the above-mentioned lighting tool for a vehicle, since the controller that forms the light distribution pattern on the basis of detection circumstances of the object detection part is provided, various light distribution patterns can be selected and realized according to the object present in front of the vehicle, and a light distribution appropriate for surrounding circumstances can be implemented.

According to the aspects of the present invention, it is possible to provide the lighting tool for a vehicle having high reliability and capable of easily realizing various light distribution patterns while enlargement of dimensions is minimized.

DETAILED DESCRIPTION OF THE INVENTION

Hereinafter, a lighting tool for a vehicle according to an embodiment will be described with reference to the accompanying drawings.

In order to make features easier to understand, the drawings used in the following description may be shown by enlarging characteristic portions for the sake of convenience, and dimensional proportions or the like of components may not necessarily be the same as actual ones.

First Embodiment

Figure 1:
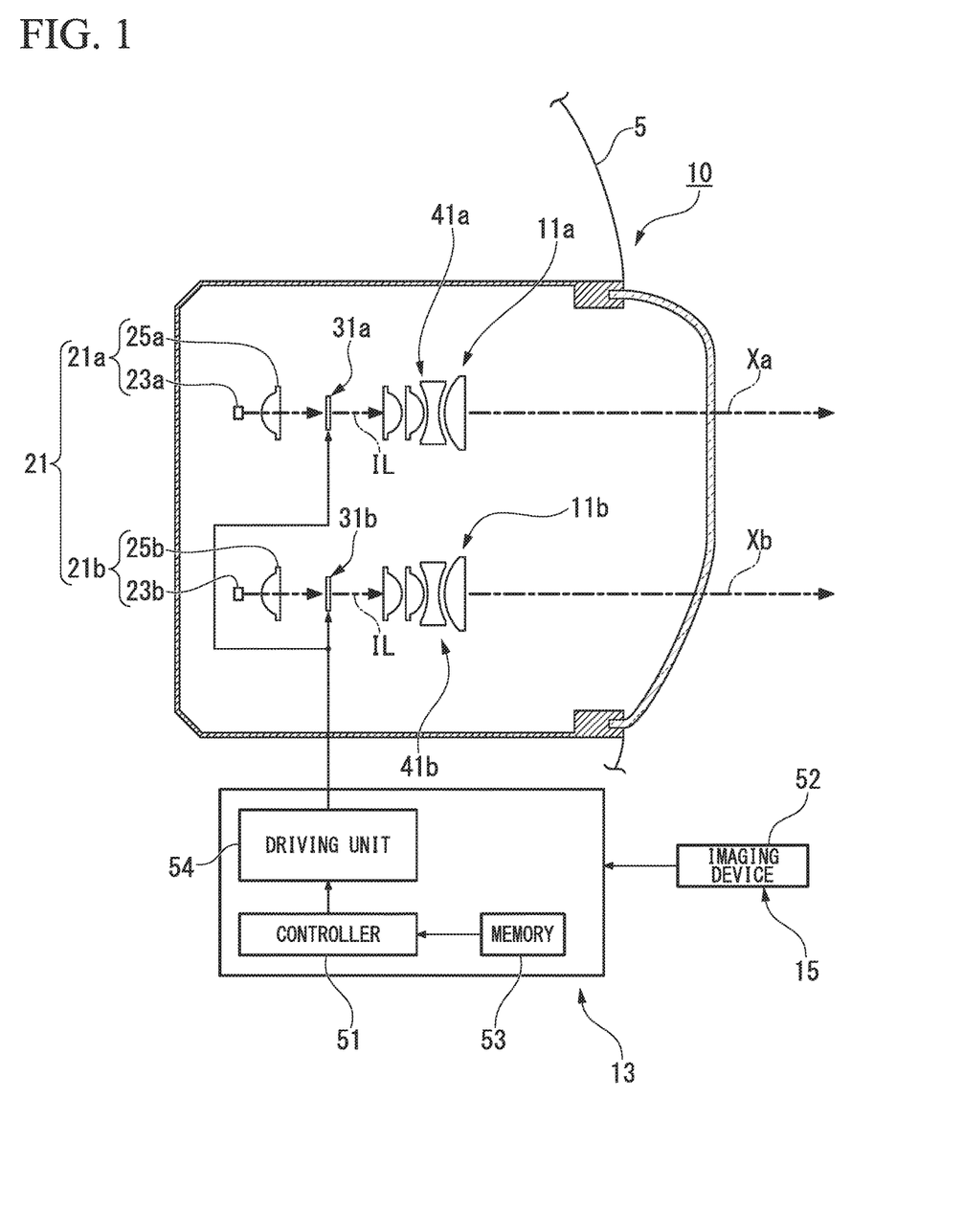
FIG. 1 is a block diagram schematically showing a lighting tool for a vehicle according to a first embodiment.

FIG. 1 is a block diagram schematically showing a lighting tool 10 for a vehicle according to a first embodiment.

Figure 2A:
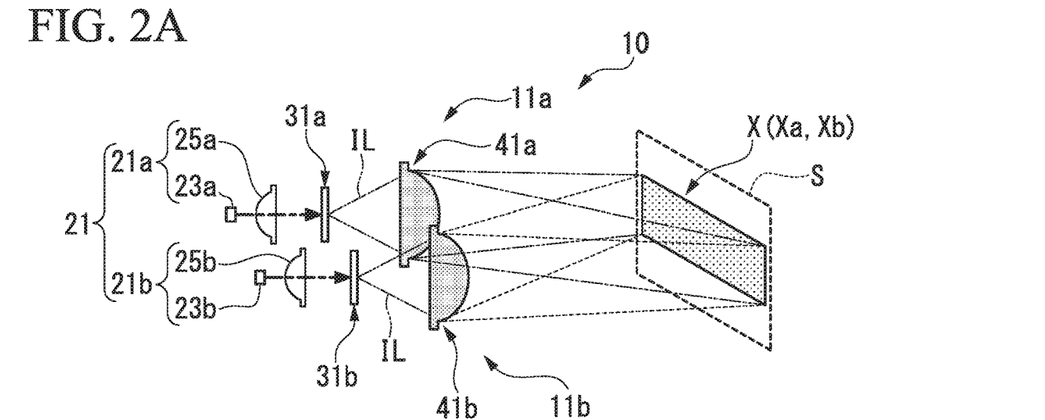
FIG. 2A is a view illustrating an arrangement in a light distribution state of a first projection module and a second projection module of the lighting tool for a vehicle according to the first embodiment.
Figure 2B:
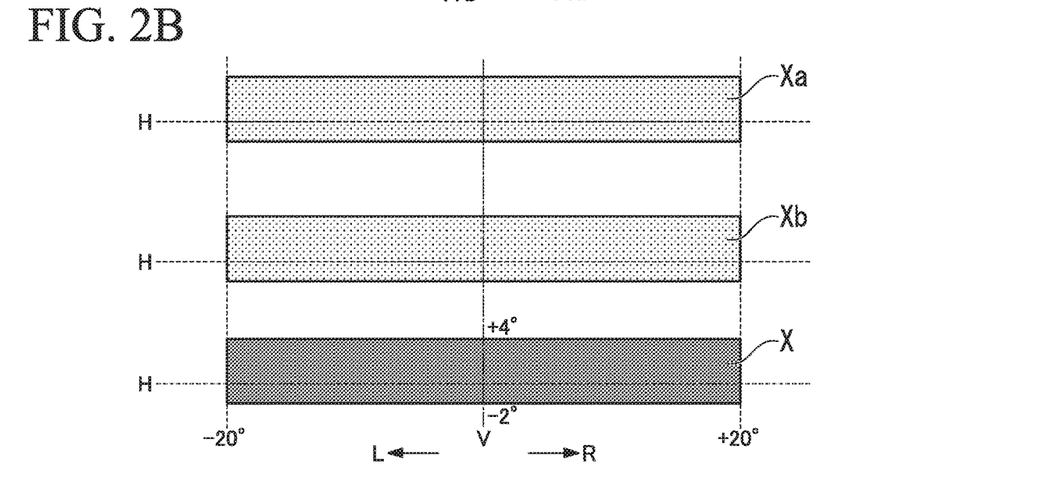
FIG. 2B is a view illustrating a light distribution pattern in the light distribution state of the first projection module and the second projection module of the lighting tool for a vehicle according to the first embodiment.
Figure 2C:
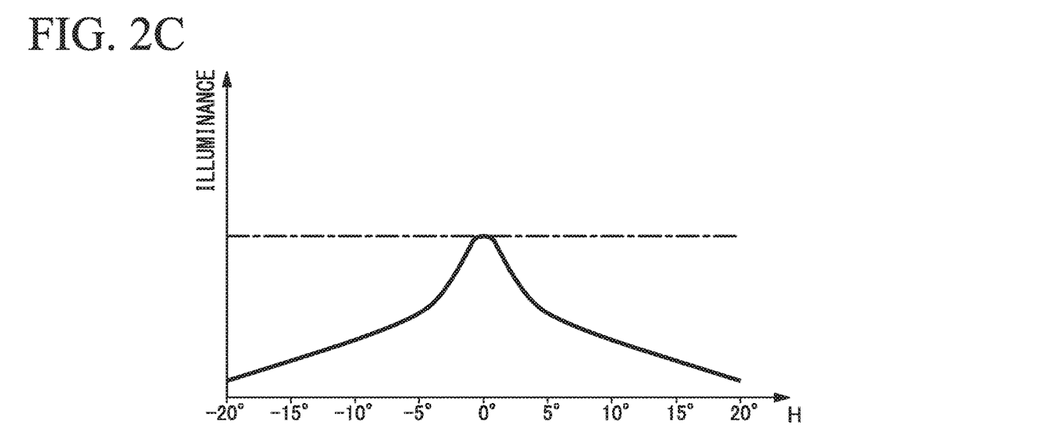
FIG. 2C is a graph showing an illuminance of the light distribution pattern in the light distribution state of the first projection module and the second projection module of the lighting tool for a vehicle according to the first embodiment.

FIG. 2A is a view illustrating an arrangement in a light distribution state of a first projection module 11a and a second projection module 11b of the lighting tool 10 for a vehicle according to the first embodiment. FIG. 2B is a view illustrating light distribution patterns Xa and Xb and a complex light distribution pattern X in the light distribution state of the first projection module 11a and the second projection module 11b of the lighting tool 10 for a vehicle according to the first embodiment. FIG. 2C is a graph showing an illuminance of the complex light distribution pattern X in the light distribution state of the first projection module 11a and the second projection module 11b of the lighting tool 10 for a vehicle according to the first embodiment.

The lighting tool 10 for a vehicle of the embodiment is a variable light distribution lighting tool configured to automatically change a light distribution pattern according to a position of an object in front of an oncoming car or the like. As shown in FIG. 1, the lighting tool 10 for a vehicle includes a light source device 21, the first projection module 11a and the second projection module 11b configured to radiate the light radiated from the light source device 21 toward a side in front of the vehicle with the light distribution patterns Xa and Xb, a control device 13 configured to control them, and an imaging device 15 configured to detect circumstances on the front side and transmit the circumstances to the control device 13.

The light source device 21 has a first light source element 21a and a second light source element 21b. The first light source element 21a irradiates the first projection module 11a with light, and the second light source element 21b irradiates the second projection module 11b with light. That is, the light source device 21 radiates light toward the first projection module 11a and the second projection module 11b.

The first light source element 21a includes a light source main body 23a configured to emit light, and a light source optical system 25a configured to refract the light from the light source main body 23a and emit the light toward the first projection module 11a. Similarly, the second light source element 21b has a light source main body 23b configured to emit light, and an optical system 25b for a light source configured to refract the light from the light source main body 23b and emit the light toward the second projection module 11b.

The light source main bodies 23a and 23b may be apparatuses such as an LED or the like configured to emit visible light, or may be apparatuses for emitting non-visible light.

The light source optical systems 25a and 25b are preferably collimating lenses configured to cause parallel light to enter liquid crystal elements 31a and 31b of the first projection module 11a and the second projection module 11b. Generally, it is known that the transmission performance of a liquid crystal element changes depending on the incident angle of light. That is, a liquid crystal element has a characteristic that the contrast (light to dark transmittance ratio) is highest for light from a specific angle (for example, a direction orthogonal to the liquid crystal element), but the contrast decreases with deviation from a specific angle. Therefore, if light incident on the liquid crystal element has an angular distribution, the light to dark transmittance ratio of the entire image light also decreases in accordance with the decrease in the contrast of the region where the light deviating furthest from the specific angle is incident. According to the light source device 21 of the embodiment, since the parallel light enters from a direction perpendicular to a surface direction of the liquid crystal element 31a, only the light having an incidence angle at which the liquid crystal element 31a has the highest contrast can be used, and a light to dark transmittance ratio of the image light can be increased.

The light source optical systems 25a and 25b may be constituted of one lens or may be constituted of a plurality of lenses arranged along the optical axes thereof.

As shown in FIG. 1 and FIG. 2A, the first projection module 11a the second projection module 11b have the liquid crystal elements 31a and 31b configured to modulate the light radiated from the light source device 21 to form image light IL, and projection optical systems 41a and 41b configured to radiate the image light IL to a virtual screen S on the front side.

The liquid crystal elements 31a and 31b have a liquid crystal panel, and a pair of polarizing plates disposed on both surface sides of the liquid crystal panel. The liquid crystal panel includes a liquid crystal layer, and a pair of boards that sandwich the liquid crystal layer. For example, polarization directions of the pair of polarizing plates are perpendicular to each other.

The projection optical systems 41a and 41b have projection lenses or the like. The projection optical systems 41a and 41b can radiate the image light IL formed by the liquid crystal elements 31a and 31b forward as the light distribution patterns Xa and Xb.

It should be noted that the lens surfaces of the projection optical systems 41a and 41b shown in FIG. 2A are schematically illustrated and are different from the actual curved shapes of the lens surfaces.

The imaging device 15 includes an object detection part 52 that detects a position, size, and the like of an object present in front of the vehicle by imaging a side in front of the vehicle and performing processing thereof, and transmits the detection circumstances to the controller 51.

The control device 13 has a memory 53 in which control information or the like of various light distribution patterns is previously set, the controller 51 configured to generate a control signal on the basis of information from the memory 53 or a signal from the imaging device 15, and a driving unit 54 configured to drive the liquid crystal elements 31a and 31b on the basis of the control signal.

The control device 13 can form the light distribution pattern Xa of the first projection module 11a and the light distribution pattern Xb of the second projection module 11b by controlling the liquid crystal elements 31a and 31b on the basis of the detection circumstances of the object detection part 52.

In the lighting tool 10 for a vehicle of the embodiment, as shown in FIG. 2A and FIG. 2B, the first light source element 21a and the second light source element 21b as well as the first projection module 11a and the second projection module 11b have the same configuration. That is, in the first light source element 21a and the second light source element 21b, the light source main bodies 23a and 23b and the light source optical systems 25a and 25b have the same configuration. In addition, in the first projection module 11a and the second projection module 11b, the liquid crystal elements 31a and 31b and the projection optical systems 41a and 41b have the same configuration. For this reason, the light distribution pattern Xa formed by the first projection module 11a and radiated forward and the light distribution pattern Xb formed by the second projection module 11b and radiated forward are formed in the same shape on the virtual screen S (or on the road surface) on the front side.

In addition, the first projection module 11a and the second projection module 11b emit light in the same direction. Accordingly, the light portions emitted from the first projection module 11a and the second projection module 11b overlap each other on the virtual screen S (or on the road surface) on the front side. The light distribution pattern Xa of the first projection module 11a and the light distribution pattern Xb of the second projection module 11b overlap each other in the entire projection range in a vertical direction V and a horizontal direction H to form the complex light distribution pattern X.

As shown in FIG. 2B, in the lighting tool 10 for a vehicle, for example, the first projection module 11a and the second projection module 11b radiate the light distribution patterns Xa and Xb, respectively, by a light distribution angle being set to ±20° in a leftward and rightward direction and a light distribution angle being set to ±3° in an upward and downward direction (upward 4° and downward 2°). In this case, the complex light distribution pattern X in which the light distribution angle in the leftward and rightward direction is ±20° and the light distribution angle in the upward and downward direction is ±3° is formed. In addition, the complex light distribution pattern X has an illuminance that is entirely higher than that of each of the light distribution patterns Xa and Xb.

According to the lighting tool 10 for a vehicle of the embodiment, the light distribution pattern Xa of the first projection module 11a and the light distribution pattern Xb of the second projection module 11b are configured to overlap each other.

For this reason, the illuminance can be increased by overlapping the plurality of light distribution patterns Xa and Xb while a shape of the irradiation region of the lighting tool 10 for a vehicle can be changed by the liquid crystal elements 31a and 31b. Accordingly, an illuminance distribution of each portion in the complex light distribution pattern X can be freely varied.

In addition, according to the embodiment, it is possible to provide a lighting tool 10 for a vehicle in which a compound-eye lighting tool in which two or more projection optical systems 41a and 41b are disposed is formed, and the design is better than that for a single-eye lens having one projection optical system.

FIG. 2C is a view showing an illuminance distribution of the complex light distribution pattern X of the lighting tool 10 for a vehicle.

A dashed line and a solid line in FIG. 2C show the complex light distribution pattern X of the illuminance distribution of the lighting tool 10 for a vehicle that can be realized by control operations that are different from each other.

The dashed line in FIG. 2C shows the complex light distribution pattern X having entirely uniform illuminance distribution. The complex light distribution pattern X of the dashed line can be realized by causing all the light to pass through the liquid crystal elements 31a and 31b of the first and second projection modules 11a and 11b.

The solid line in FIG. 2C is the complex light distribution pattern X having the illuminance distribution that forms a region in which an illuminance is high at a central portion (a high illuminance region). The complex light distribution pattern X of the solid line can be realized by adjusting a transmissivity in any one or both of the liquid crystal elements 31a and 31b of the first and second projection modules 11a and 11b. More specifically, this can be realized by gradually reducing the proportion of light which is transmitted in the liquid crystal elements 31a and 31b moving away from the center in the horizontal direction.

According to the complex light distribution pattern X of the solid line, since the high illuminance region can be formed at the center, a light distribution that is easily seen by a driver can be realized.

Further, when the lighting tool 10 for a vehicle of the embodiment is used as an adaptive driving beam (ADB: a variable light distribution type lighting tool), since the light that enters the liquid crystal elements 31a and 31b of the first and second projection modules 11a and 11b is partially shielded (i.e., transmissivity is 0%), a non-irradiation region is formed on the complex light distribution pattern X.

According to the lighting tool 10 for a vehicle of the embodiment, since the entire projection ranges overlap each other in direction of one axis (in the embodiment, directions of two axes which are the horizontal direction H and the vertical direction V) in the light distribution patterns Xa and Xb of both of the projection modules 11a and 11b, it is easy to configure the first projection module 11a and the second projection module 11b in the same way. For example, the projection optical systems 41a and 41b can also be used like the first projection module 11a and the second projection module 11b.

Therefore, it is possible to achieve sharing of parts, and it is possible to form a vehicular lamp 10 in which the illuminance can be varied greatly with the same shape of light distribution pattern depending on few types of components. Thereby, it is possible to form various complex light distribution patterns X depending on an inexpensive configuration.

In addition, according to the lighting tool 10 for a vehicle of the embodiment, since the first projection module 11a and the second projection module 11b have the liquid crystal elements 31a and 31b and the projection optical systems 41a and 41b, it is possible to provide the lighting tool 10 for a vehicle that is compact as a whole without increasing the size of the liquid crystal elements 31a and 31b and the projection optical systems 41a and 41b.

In addition, according to the lighting tool 10 for a vehicle of the embodiment, since the light from the plurality of light sources does not enter the one liquid crystal element, it is possible to provide the lighting tool for a vehicle having high reliability while preventing a phase change of a liquid crystal due to an increase in temperature of the liquid crystal elements 31a and 31b.

In addition, according to the lighting tool 10 for a vehicle of the embodiment, the controller 51 configured to form the light distribution patterns Xa and Xb on the basis of the detection circumstances of the object detection part 52 is provided. For this reason, various complex light distribution patterns X can be selected and realized according to a position, a size, or the like, of an object present in front of the vehicle, and a light distribution appropriate for surrounding circumstances can be implemented.

Further, while the first light source element 21a and the second light source element 21b having the same structure are used in the embodiment, light source elements having different light emission luminances may be used.

Accordingly, the illuminance of the complex light distribution pattern X can be varied over multiple stages.

Second Embodiment

Figure 3A:
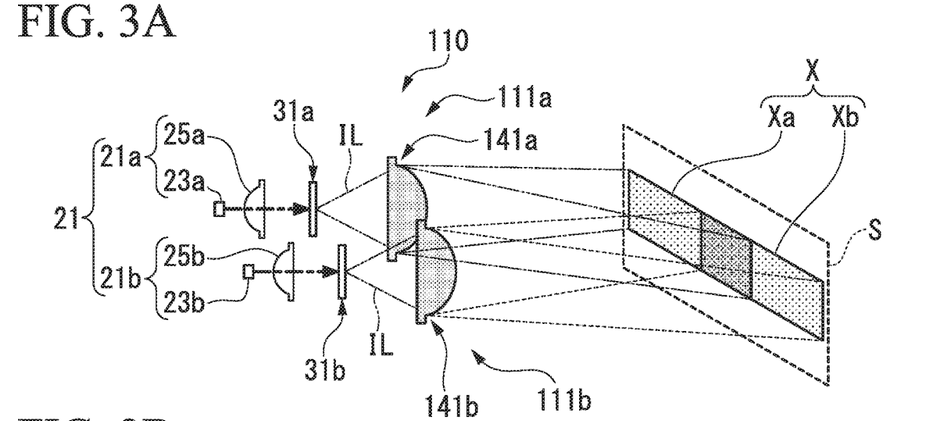
FIG. 3A is a view illustrating an arrangement in a light distribution state of a first projection module and a second projection module of a lighting tool for a vehicle according to a second embodiment.
Figure 3B:
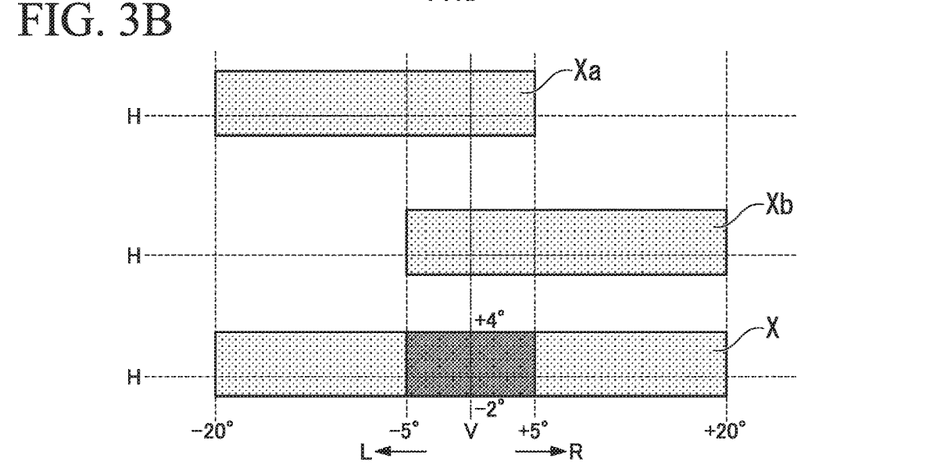
FIG. 3B is a view illustrating a light distribution pattern in the light distribution state of the first projection module and the second projection module of the lighting tool for a vehicle according to the second embodiment.
Figure 3C:
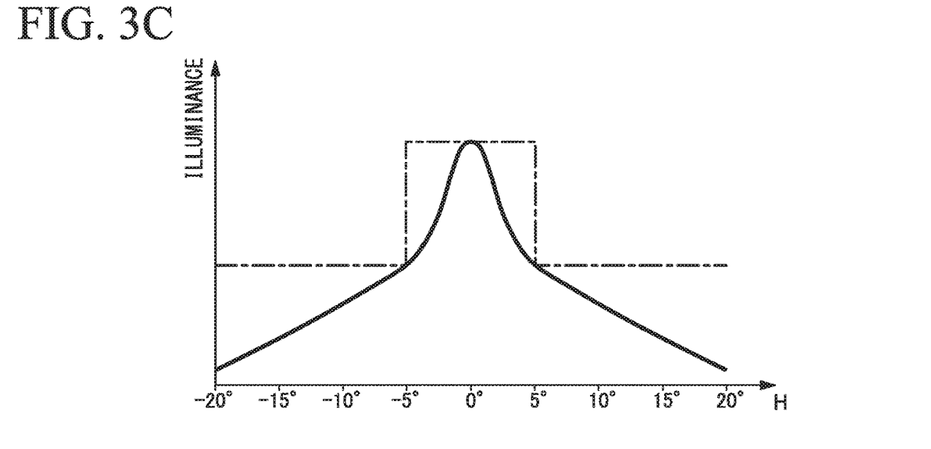
FIG. 3C is a graph showing an illuminance of the light distribution pattern in the light distribution state of the first projection module and the second projection module of the lighting tool for a vehicle according to the second embodiment.

FIG. 3A is a view illustrating an arrangement in a light distribution state of a first projection module 111a and a second projection module 111b of a lighting tool 110 for a vehicle according to a second embodiment. FIG. 3B is a view illustrating the light distribution patterns Xa and Xb and the complex light distribution pattern X in the light distribution state of the first projection module 111a and the second projection module 111b of the lighting tool 110 for a vehicle according to the second embodiment. FIG. 3C is a graph showing an illuminance of the complex light distribution pattern X in the light distribution state of the first projection module 111a and the second projection module 111b of the lighting tool 110 for a vehicle according to the second embodiment.

Like the first embodiment, the lighting tool 110 for a vehicle of the embodiment includes the light source device 21, the first projection module 111a and the second projection module 111b, the control device 13 configured to control them, and the imaging device 15. Further, components which are the same as in the above-mentioned embodiment are designated by the same reference numerals, and description thereof will be omitted.

The control device 13 and the imaging device 15 of the embodiment are distinguished from those in the first embodiment in that various light distribution patterns previously set in the memory 53 or the like are different from each other.

As shown in FIG. 3A, like the first embodiment, the first projection module 111a and the second projection module 111b have the liquid crystal elements 31a and 31b, and projection optical systems 141a and 141b. In addition, the liquid crystal elements 31a and 31b of the embodiment have the same configurations as in the first embodiment.

In the embodiment, the projection optical systems 141a and 141b of the first projection module 111a and the second projection module 111b are constituted by the same members as each other. However, the projection optical systems 141a and 141b have light distribution directions that are different in the first projection module 111a and the second projection module 111b. That is, the light from the first projection module 111a and the light from the second projection module 111b are set to partially overlap when radiated.

Further, lens surfaces of the projection optical systems 141a and 141b shown in FIG. 3A are schematically disclosed, and curved shapes of the lens surface in actuality are different from each other.

In the above-mentioned lighting tool 110 for a vehicle, since the light distribution pattern Xa of the first projection module 111a and the light distribution pattern Xb of the second projection module 111b have projection ranges in the horizontal direction H that are deviated from each other and partially overlap each other, the complex light distribution pattern X is formed.

In the complex light distribution pattern X, since the light distribution patterns Xa and Xb are deviated from and overlap each other, a luminous intensity distribution required for the lighting tool 110 for a vehicle is satisfied. That is, a distribution in which the center is the brightest and a luminous intensity abruptly decreases toward the ends thereof is achieved. Further, a smooth mountain type light distribution pattern can be formed by modulating light through control of the liquid crystal elements 31a and 31b.

As shown in FIG. 3B, in the lighting tool 110 for a vehicle, for example, the first projection module 111a radiates the light distribution pattern Xa by setting the light distribution angle as leftward 20° and rightward 5°, and upward and downward ±3° (upward 4° and downward 2°). Meanwhile, the second projection module 111b radiates the light distribution pattern Xb by setting the light distribution angle as leftward 5° and rightward 20°, and upward and downward ±3° (upward 4° and downward 2°).

In this case, the light distribution pattern Xa of the first projection module 111a and the light distribution pattern Xb of the second projection module 111b overlap each other within a range of a light distribution angle of ±5° from the center in the leftward and rightward direction, and the complex light distribution pattern X is formed. The complex light distribution pattern X has an illuminance that is increased in the regions overlapping each other. That is, the two light distribution patterns Xa and Xb can be combined to satisfy a luminous intensity distribution required for the lighting tool 110 for a vehicle.

Here, the light distribution angles of the light distribution patterns Xa and Xb of the projection modules 111a and 111b can be set using a magnification ratio of the lenses of the projection optical systems 141a and 141b, specifically, a focal distance. When the light distribution angles of the light distribution patterns Xa and Xb of the projection modules 111a and 111b are set to 25° and the light distribution angles of the complex light distribution patterns X of both of the projection modules 111a and 111b are set to ±20°, a focal distance between the projection optical systems 141a and 141b of the projection modules 111a and 111b in the horizontal direction is set to be larger than a focal distance when the light distribution angle is set to ±20° by the single projection optical system.

According to the lighting tool 110 for a vehicle of the embodiment, a configuration in which projection ranges of the light distribution pattern Xa of the first projection module 111a and the light distribution pattern Xb of the second projection module 111b in the direction of one axis (in the embodiment, the horizontal direction H) are deviated from each other and partially overlap each other is provided. For this reason, a region having a high illuminance and a region having a low illuminance can be formed in the overall complex light distribution pattern X of the lighting tool 110 for a vehicle, and various complex light distribution patterns X can be formed.

In addition, in the lighting tool 110 for a vehicle of the embodiment, the first projection module 111a and the second projection module 111b can be constituted by the same members. Accordingly, the various complex light distribution patterns X can be realized by an inexpensive configuration.

In addition, according to the embodiment, like the above-mentioned embodiment, since the first projection module 111a and the second projection module 111b have the liquid crystal elements 31a and 31b and the projection optical systems 141a and 141b, it is possible to provide the lighting tool 110 for a vehicle having high reliability with a compact structure as a whole while preventing a phase change.

In addition, according to the embodiment, the projection modules 111a and 111b independently have the liquid crystal elements 31a and 31b, respectively. As a result, accordingly, it is possible to change the shape of the irradiation region of the lighting tool 110 for a vehicle and to overlap the plurality of light distribution patterns Xa and Xb with each other, and therefore, the illuminance distribution at each parts within the complex light distribution pattern X can be freely varied.

In addition, according to the embodiment, it is possible to provide the lighting tool 110 for a vehicle having the compound-eye lighting tool in which the two projection optical systems 141a and 141b or more are arranged and a design is better than that of a single-eye lens having one projection optical system.

FIG. 3C is a view showing an illuminance distribution of the complex light distribution pattern X of the lighting tool 110 for a vehicle.

A dashed line and a solid line of FIG. 3C show the complex light distribution pattern X of the illuminance distribution of the lighting tool 110 for a vehicle that can be realized by control operations that are different with each other.

The complex light distribution pattern X of the dashed line in FIG. 3C can be realized by causing all the light to pass through the liquid crystal elements 31a and 31b of the first and second projection modules 111a and 111b.

The complex light distribution pattern X of the solid line in FIG. 3C can be realized by adjusting a transmissivity in anyone or both of the liquid crystal elements 31a and 31b of the first and second projection modules 111a and 111b.

A difference between an area of the region surrounded by the dashed line and an area of the region surrounded by the solid line corresponds to a light quantity shielded and discarded by the liquid crystal elements 31a and 31b in order to realize the light distribution pattern of the solid line. According to the embodiment, the light distribution patterns Xa and Xb of the first and second projection modules 111a and 111b can overlap each other to suppress the light quantity discharged to form the high illuminance region of the center, and the complex light distribution pattern X having high efficiency can be realized.

Third Embodiment

Figure 4A:
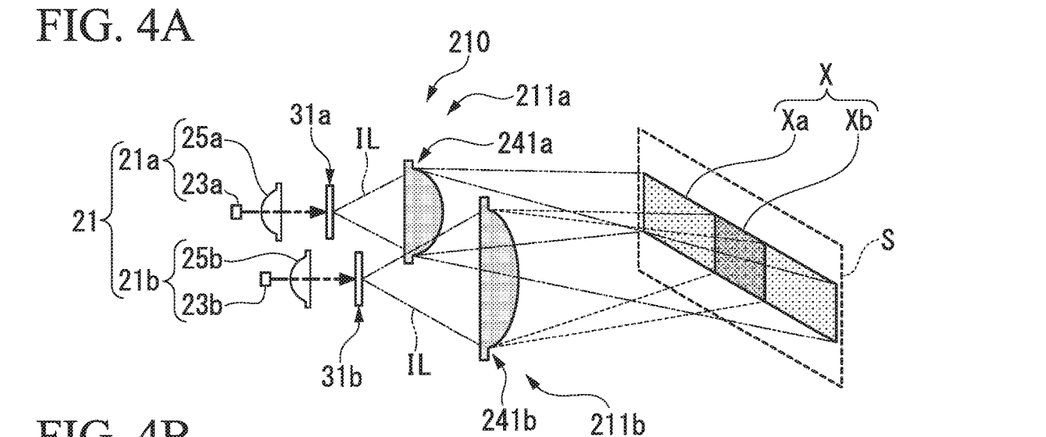
FIG. 4A is a view illustrating an arrangement in a light distribution state of a first projection module and a second projection module of a lighting tool for a vehicle according to a third embodiment.
Figure 4B:
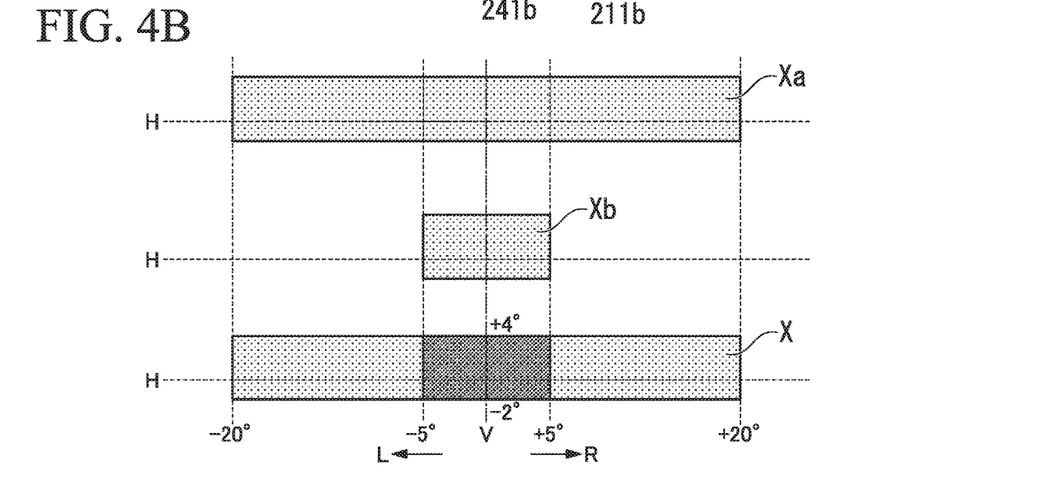
FIG. 4B is a view illustrating a light distribution pattern in the light distribution state of the first projection module and the second projection module of the lighting tool for a vehicle according to the third embodiment.
Figure 4C:
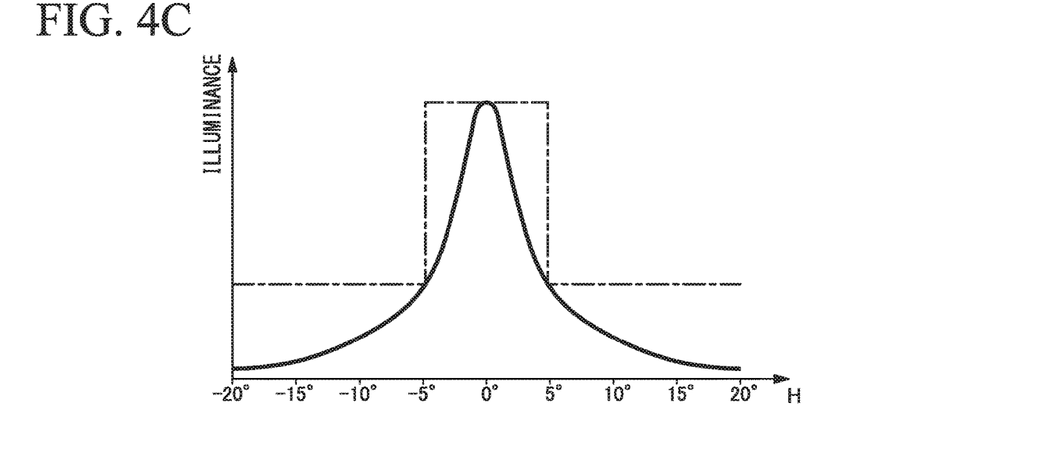
FIG. 4C is a graph showing an illuminance of the light distribution pattern in the light distribution state of the first projection module and the second projection module of the lighting tool for a vehicle according to the third embodiment.

FIG. 4A is a view illustrating an arrangement in a light distribution state of a first projection module 211a and a second projection module 211b of a lighting tool 210 for a vehicle according to a third embodiment. FIG. 4B is a view illustrating the light distribution patterns Xa and Xb and the complex light distribution pattern X in the light distribution state of the first projection module 211a and the second projection module 211b of the lighting tool 210 for a vehicle according to the third embodiment. FIG. 4C is a graph showing an illuminance of the complex light distribution pattern X in the light distribution state of the first projection module 211a and the second projection module 211b of the lighting tool 210 for a vehicle according to the third embodiment.

Like the first embodiment, the lighting tool 210 for a vehicle of the embodiment includes the light source device 21, the first projection module 211a and the second projection module 211b, the control device 13 configured to control them, and the imaging device 15. Further, components which are the same as in the above-mentioned embodiment are designated by the same reference numerals, and description thereof will be omitted.

The control device 13 and the imaging device 15 are distinguished from those in the above-mentioned embodiments in that various light distribution patterns previously set in the memory 53 or the like are different from each other.

As shown in FIG. 4A, like the first embodiment, the first projection module 211a and the second projection module 211b have the liquid crystal elements 31a and 31b, and projection optical systems 241a and 241b. In addition, the liquid crystal elements 31a and 31b of the embodiment have the same configuration as the above-mentioned embodiments.

In the embodiment, the projection optical systems 241a and 241b of the first projection module 211a and the second projection module 211b have different magnification ratios. More specifically, a focal distance of the projection optical system 241a of the first projection module 211a in the horizontal direction is set to be smaller than a focal distance of the projection optical system 241b of the second projection module 211b in the horizontal direction.

Accordingly, a projection range of the light distribution pattern Xa in the horizontal direction H formed by the first projection module 211a is configured to be wider than a projection range of the light distribution pattern Xb in the horizontal direction H in the projection optical system 241b of the second projection module 211b.

In addition, the light from the projection optical system 241a of the first projection module 211a and the projection optical system 241b of the second projection module 211b is distributed toward a common center. For this reason, the projection range of the projection optical system 241b of the second projection module 211b is included in the projection range of the projection optical system 241a of the first projection module 211a.

Further, the lens surfaces of the projection optical systems 241a and 241b shown in FIG. 4A are schematically disclosed, and curved shapes of the lens surfaces in actuality are different. More specifically, the lens surfaces of the projection optical systems 241a and 241b in FIG. 4A are schematically shown such that the curvatures of the lens surfaces in the upward and downward direction are different from each other. However, the lens surfaces of the projection optical systems 241a and 241b of the embodiment have different curvatures in the leftward and rightward direction.

In the above-mentioned lighting tool 210 for a vehicle, the light from the first projection module 211a is distributed in the projection range that is wide in the horizontal direction H, and the light from the second projection module 211b is distributed in a spot shape about the projection range from the first projection module 211a.

For this reason, a luminous intensity distribution required for the lighting tool 210 for a vehicle in which a center is most bright and the luminous intensity is abruptly decreased toward the end can be satisfied.

As shown in FIG. 4B, in the lighting tool 210 for a vehicle, for example, the first projection module 211a radiates the light distribution pattern Xa while setting the light distribution angle in the leftward and rightward direction as ±20° and setting the light distribution angle in the upward and downward direction as ±3° (upward 4° and downward 2°). Meanwhile, the second projection module 211b radiates the light distribution pattern Xb while setting the light distribution angle in the leftward and rightward direction as ±5° and setting the light distribution angle in the upward and downward direction as ±3°.

In this case, the light distribution pattern Xa of the first projection module 211a and the light distribution pattern Xb of the second projection module 211b overlap each other within a range of a light distribution angle of ±5° in the leftward and rightward direction, and the complex light distribution pattern X is formed. The complex light distribution pattern X has an illuminance that is increased in the region in which the patterns overlap each other. That is, the two light distribution patterns Xa and Xb can be combined thereby to satisfy the luminous intensity distribution required for the lighting tool 210 for a vehicle.

The light distribution angles of the light distribution patterns Xa and Xb of the projection modules 211a and 211b are set by a magnification ratio of the lenses of the projection optical systems 241a and 241b, specifically, a focal distance. Since the focal distance of the projection optical system 241b of the second projection module 211b is set to be larger than the focal distance of the projection optical system 241a of the first projection module 211a, the center of the complex light distribution pattern X is irradiated with the light of the second projection module 211b.

According to the lighting tool 210 for a vehicle of the embodiment, the projection range of the light distribution pattern Xb of the second projection module 211b in the direction of one axis (in the embodiment, the horizontal direction H) is included in the projection range of the light distribution pattern Xa of the first projection module 211a in the direction of one axis (in the embodiment, the horizontal direction H). Accordingly, an illuminance of a portion of the light distribution pattern Xa formed by the first projection module 211a can be locally increased to be higher than that of the other portion.

In addition, according to the embodiment, the projection modules 211a and 211b independently have the liquid crystal elements 31a and 31b, respectively. As a result, accordingly, since the plurality of light distribution patterns Xa and Xb overlap each other while a shape of the irradiation region of the lighting tool 210 for a vehicle can be varied, the illuminance distribution of each part in the complex light distribution pattern X can be freely varied.

In addition, according to the embodiment, like the above-mentioned embodiment, since the first projection module 211a and the second projection module 211b have the liquid crystal elements 31a and 31b and the projection optical systems 241a and 241b, it is possible to provide the lighting tool 210 for a vehicle having high reliability with a compact structure as a whole while preventing a phase change.

In addition, according to the embodiment, it is possible to provide the lighting tool 210 for a vehicle constituted by the compound-eye lighting tool having the two projection optical systems 241a and 241b or more that are arranged and in which a design is higher than that of the single-eye lens having one projection optical system.

FIG. 4C is a view showing an illuminance distribution of the complex light distribution pattern X of the lighting tool 210 for a vehicle.

A dashed line and a solid line in FIG. 4C show the complex light distribution pattern X of the illuminance distribution of the lighting tool 210 for a vehicle that can be realized by control operations that are different with each other.

The complex light distribution pattern X of the dashed line in FIG. 4C can be realized by causing all the light to pass through the liquid crystal elements 31a and 31b of the first and second projection modules 211a and 211b.

The complex light distribution pattern X of the solid line in FIG. 4C can be realized by adjusting a transmissivity in anyone or both of the liquid crystal elements 31a and 31b of the first and second projection modules 211a and 211b.

According to the embodiment, since the light distribution pattern Xb of the second projection module 211b corresponding to the high illuminance region of the center overlaps the light distribution pattern Xa of the first projection module 211a, a quantity of the discarded light can be minimized, and the complex light distribution pattern X having high efficiency can be realized. In addition, according to the embodiment, the illuminance of the high illuminance region can be further increased in comparison with the second embodiment.

Fourth Embodiment

Figure 5A:
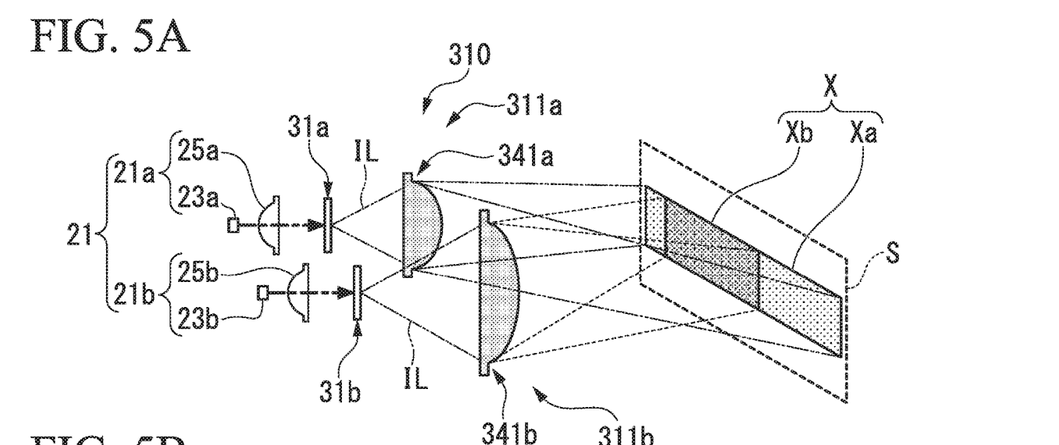
FIG. 5A is a view illustrating an arrangement in a light distribution state of a first projection module and a second projection module of a lighting tool for a vehicle according to a fourth embodiment.
Figure 5B:
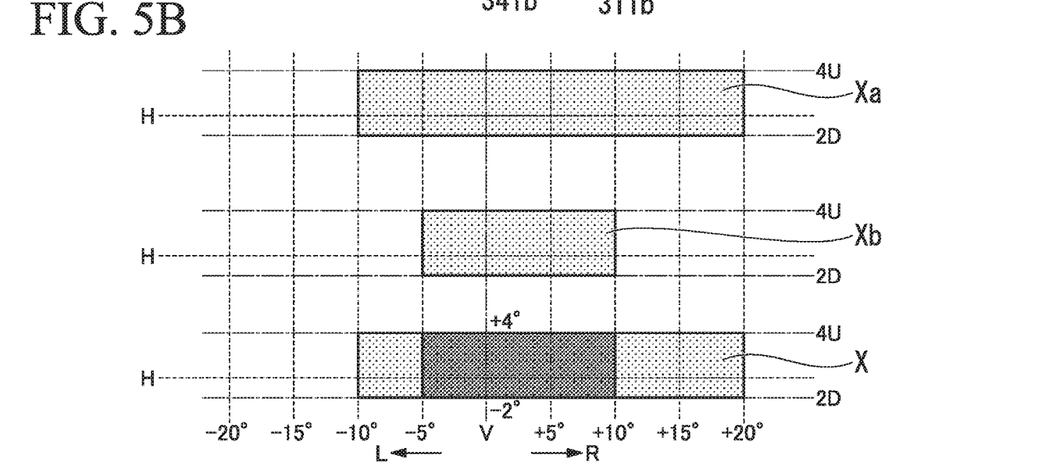
FIG. 5B is a view illustrating a light distribution pattern in the light distribution state of the first projection module and the second projection module of the lighting tool for a vehicle according to the fourth embodiment.
Figure 5C:
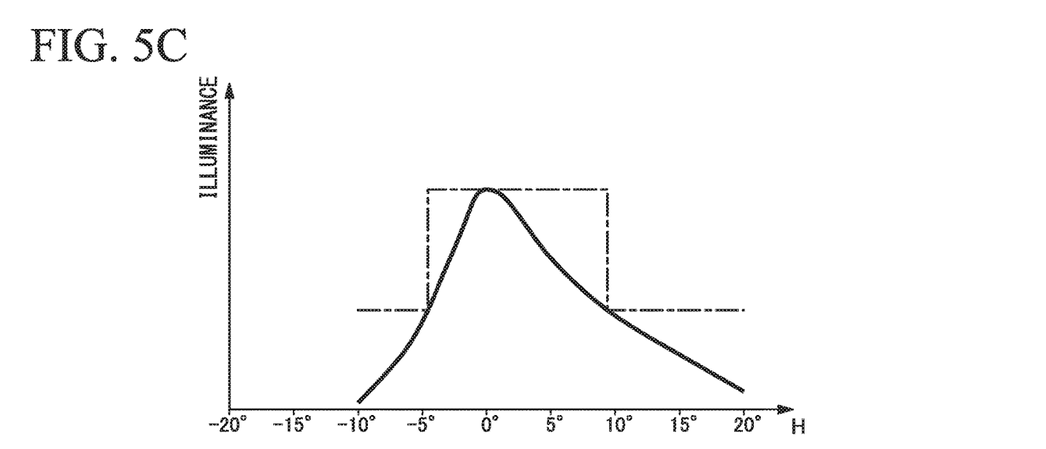
FIG. 5C is a graph showing an illuminance of the light distribution pattern in the light distribution state of the first projection module and the second projection module of the lighting tool for a vehicle according to the fourth embodiment.

FIG. 5A is a view illustrating an arrangement in a light distribution state of a first projection module 311a and a second projection module 311b of a lighting tool 310 for a vehicle according to a fourth embodiment. FIG. 5B is a view illustrating the light distribution patterns Xa and Xb and the complex light distribution pattern X in the light distribution state of the first projection module 311a and the second projection module 311b of the lighting tool 310 for a vehicle according to the fourth embodiment. FIG. 5C is a graph showing an illuminance of the complex light distribution pattern X in the light distribution state of the first projection module 311a and the second projection module 311b of the lighting tool 310 for a vehicle according to the fourth embodiment.

Like the third embodiment, the lighting tool 310 for a vehicle of the embodiment includes the light source device 21, the first projection module 311a and the second projection module 311b, the control device 13 configured to control them, and the imaging device 15. Further, components which are the same as in the above-mentioned embodiment are designated by the same reference numerals, and description thereof will be omitted.

The control device 13 and the imaging device 15 are distinguished from those in the above-mentioned embodiments in that various light distribution patterns previously set in the memory 53 or the like are different from each other.

As shown in FIG. 5A, like the third embodiment, the first projection module 311a and the second projection module 311b have the liquid crystal elements 31a and 31b, and projection optical systems 341a and 341b.

The embodiment is distinguished from those in the third embodiment in that sizes and positions of the light distribution patterns Xb formed by the first and second projection modules 311a and 311b are different.

In the embodiment, the projection range of the projection optical system 341a of the first projection module 311a is deviated from the center toward one side in the horizontal direction. In addition, the projection range of the projection optical system 341b of the second projection module 311b in the horizontal direction H is wider than that in the third embodiment, and a projection direction is deviated from the center toward one side in the horizontal direction. That is, the light distribution patterns Xa and Xb of the first and second projection modules 311a and 311b are laterally asymmetric with respect to the front surface of the vehicle. In addition, the projection range of the light distribution pattern Xa of the first projection module 311a in the horizontal direction includes the projection range of the light distribution pattern of the second projection module 311b in the horizontal direction. As a result, the high illuminance region of the complex light distribution pattern X in which the light distribution patterns Xa and Xb of the first and second projection modules 311a and 311b overlap each other is disposed to be deviated to one side in the horizontal direction.

In the above-mentioned lighting tool 310 for a vehicle, the light from the first projection module 311a is distributed within a wide range in the horizontal direction H, and the light from the second projection module 311b is distributed within a range closer to one side in the horizontal direction H of the projection range from the first projection module 311a. For this reason, the light distribution pattern having an improved illuminance within a range closer to one side in a predetermined projection range can be formed.

As shown in FIG. 5B, in the lighting tool 310 for a vehicle, for example, the first projection module 311a radiates the light distribution pattern Xa while setting the light distribution angle in the leftward and rightward direction as leftward 10° and rightward 20°, and setting the light distribution angle in the upward and downward direction as ±3° (upward 4° and downward 2°). Meanwhile, the second projection module 311b radiates the light distribution pattern Xb while setting the light distribution angle in the leftward and rightward direction as leftward 5° and rightward 10°, and setting the light distribution angle in the upward and downward direction as ±3°.

In this case, the light distribution pattern Xa of the first projection module 311a, which is projected to the right side, and the light distribution pattern Xb of the second projection module 311b, which is projected to the right side while being included in the light distribution pattern Xa, overlap with each other to form the complex light distribution pattern X. The complex light distribution pattern X has an illuminance that is increased in a region in which the patterns overlap with each other. That is, the two light distribution patterns Xa and Xb are combined to provide a region having a locally high illuminance, and moreover, the complex light distribution pattern X that is laterally asymmetric can be formed.

According to the lighting tool 310 for a vehicle of the embodiment, the light distribution pattern Xb of the second projection module 311b is disposed closer to one side in the direction of one axis (in the embodiment, the horizontal direction H) with respect to the light distribution pattern Xa of the first projection module 311a. For this reason, the illuminance at a position closer to one side of the complex light distribution pattern X radiated from the lighting tool 310 for a vehicle can be easily improved. Accordingly, illuminances of various regions in the complex light distribution pattern X of the lighting tool 310 for a vehicle can be easily increased, and a wide region having a high illuminance can be formed.

In addition, according to the embodiment, the projection modules 311a and 311b independently have the liquid crystal elements 31a and 31b, respectively. As a result, accordingly, it is possible to change the shape of the irradiation region of the lighting tool 310 for a vehicle and to overlap the plurality of light distribution patterns Xa and Xb with each other, and therefore, the illuminance distribution at each parts within the complex light distribution pattern X can be freely varied.

In addition, according to the embodiment, like the above-mentioned embodiment, since the first projection module 311a and the second projection module 311b have the liquid crystal elements 31a and 31b and the projection optical systems 341a and 341b, it is possible to provide the lighting tool 310 for a vehicle having high reliability with a compact structure as a whole while preventing a phase change.

In addition, according to the embodiment, it is possible to provide the lighting tool 310 for a vehicle in which a compound-eye lighting tool having the two projection optical systems 341a and 341b or more that are arranged is provided, and a design is higher than that of a single-eye lens having one projection optical system.

The lighting tool 310 for a vehicle of the embodiment is used as a headlight mounted on a right side of the vehicle. In general, when lighting tool for a vehicle is mounted on the vehicle, the light emitted from the vicinity of the end portion inside the vehicle is easily obstructed by another member (a body, decoration parts of the lighting tool for a vehicle, and so on). According to the embodiment, since the complex light distribution pattern X that is laterally asymmetric is formed, the radiated light can be effectively used by narrowing a light distribution angle inside the vehicle (in the leftward direction) that is likely to be inhibited by another member.

Further, another lighting tool for a vehicle having a laterally symmetrical structure of the embodiment is preferably mounted on the left side of the vehicle. In this case, the complex light distribution pattern of the other lighting tool for a vehicle mounted on the left side of the vehicle is laterally symmetrical with respect to the complex light distribution pattern X of the lighting tool 310 for a vehicle mounted on the right side. Each of the complex light distribution patterns projected from the left and right lighting tools 310 for a vehicle overlap with each other in front of the vehicle, and as a result, a laterally symmetrical light distribution pattern can be realized.

(Variant)

Figure 6:
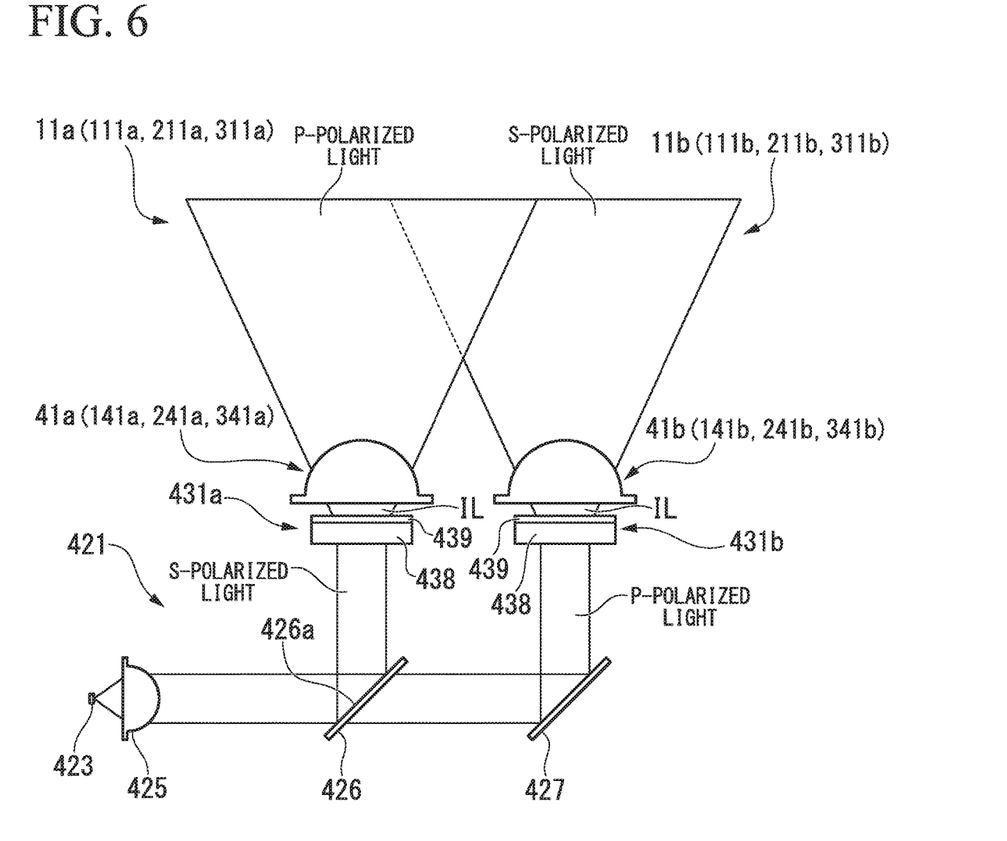
FIG. 6 is a schematic view illustrating a light source device and a liquid crystal element of a variant.

FIG. 6 shows a light source device 421 and liquid crystal elements 431a and 431b of a variant that can be applied to the above-mentioned embodiments. In the following description, while the case in which the configuration of the variant is applied to the lighting tool for a vehicle of the first embodiment has been described, the variant may also be applied similarly to another embodiment.

The light source device 421 of the variant has a light source main body 423, a light source optical system 425 configured to set the light radiated from the light source main body 423 as parallel light, a polarization beam splitter 426, and a mirror 427.

The polarization beam splitter 426 is a polarization separating element configured to cause the incident light to branch off to the polarized light. The polarization beam splitter 426 reflects some of the light emitted from the light source optical system 425 as s-polarized light (first polarized light). In addition, the polarization beam splitter 426 causes the other part of the light emitted from the light source optical system 425 to pass therethrough as p-polarized light (second polarized light in which the first polarized light and the polarization direction are perpendicular to each other). Further, here, separation of the s-polarized light and the p-polarized light in the polarization direction by the polarization beam splitter 426 is preferably adjusted to become a ratio of 1:1.

The polarization beam splitter 426 has a reflective surface 426a. The reflective surface 426a is disposed to be inclined (preferably 45°) with respect to a direction of the light emitted from the light source optical system 425.

The liquid crystal elements 431a and 431b are transmission type liquid crystal elements. The s-polarized light reflected by the polarization beam splitter 426 enters the liquid crystal element 431a of the first projection module 11a. Meanwhile, p-polarized light passing through the polarization beam splitter 426 and reflected by the mirror 427 enters the liquid crystal element 431b of the second projection module 11b.

The liquid crystal elements 431a and 431b have liquid crystal panels 438, and polarizing plates 439 disposed on emission sides of the liquid crystal panels 438, respectively. Each of the liquid crystal panels 438 includes a liquid crystal layer (not shown) and a pair of boards (not shown) configured to sandwich the liquid crystal layer therebetween. The liquid crystal layers of the liquid crystal panels 438 are horizontally oriented such that a liquid crystal molecule is twisted between the pair of boards by 90 degrees. That is, the liquid crystal panels 438 are twist nematic (TN) type liquid crystal panels that are twisted by 90 degrees. The polarizing plates 439 of the liquid crystal element 431a of the first projection module 11a allow penetration of the p-polarized light only. Meanwhile, the polarizing plates 439 of the liquid crystal element 431b of the second projection module 11b allow penetration of the s-polarized light only.

The liquid crystal elements 431a and 431b can rotate a polarization direction of a wide wavelength band by 90 degrees by the liquid crystal molecules being twisted and oriented to pass the light therethrough. The liquid crystal elements 431a and 431b rotate the polarized light emitted from the polarization beam splitter 426 by about 90 degrees in a region in which a voltage is not applied to the liquid crystal layer and the polarized light is propagated in the liquid crystal elements such that it passes through a polarizing plate 493, and propagate the polarized light in the liquid crystal element to be absorbed by the polarizing plate 493 without being rotated in a region to which the voltage is applied. The two regions are formed in surfaces of the liquid crystal elements 431a and 431b as shapes on the basis of a signal received from the control device 13 (see FIG. 1) (a voltage applied to the liquid crystal element).

The light that is parallel light emitted from the light source main body 423 and entering the polarization beam splitter 426 has an s-polarized light element and a p-polarized light element because the parallel light is non-polarized light. The light is divided into s-polarized light reflected by the reflective surface 426a of the polarization beam splitter 426 and p-polarized light passing through the reflective surface 426a. The s-polarized light enters the liquid crystal element 431a of the first projection module 11a, and the p-polarized light enters the liquid crystal element 431b of the second projection module 11b.

The first projection module 11a modulates the s-polarized light reflected by the polarization beam splitter 426 in the liquid crystal element 431a into the image light IL, and radiates the image light IL forward as a light distribution pattern in the projection optical system 41a. Meanwhile, the second projection module 11b modulates the p-polarized light passing through the polarization beam splitter 426 in the liquid crystal element 431b into the image light IL, and radiates the image light IL forward as a light distribution pattern in the projection optical system 41b.

The liquid crystal elements 431a and 431b of the variant rotates the polarization direction in the region to which the voltage is not applied to form the image light IL, and the image light IL is absorbed by the polarizing plate 493 in the region to which the voltage is applied without rotating the polarization direction. However, in the variant, the image light IL emitted from the first projection module 11a is p-polarized light, and the image light IL emitted from the second projection module 11b is s-polarized light.

However, the polarization direction of the image light formed by the liquid crystal elements 431a and 431b is not particularly limited to the examples of the embodiment. That is, the image light IL emitted from the first projection module 11a may be s-polarized light, and the image light IL emitted from the second projection module 11b may be p-polarized light. In this case, the polarization axis of the polarizing plate 493 is disposed to be rotated by 90° in comparison with the variant, the image light is formed by the light passing through the region to which the voltage is applied, and the light passing through the region to which the voltage is not applied is absorbed by the polarizing plate.

That is, the polarization direction of the light passing through the liquid crystal elements 431a and 431b is appropriately set by the configurations of the liquid crystal elements 431a and 431b and the polarizing plate 493.

According to the light source device 421 of the variant, since the light radiated from the one light source main body 423 is branched and used, the number of light source main bodies 423 can be reduced, and the lighting tool for a vehicle can be reduced in size.

In addition, according to the light source device 421 of the variant, since the light is divided into the s-polarized light and the p-polarized light by the polarization beam splitter 426, the image light IL can be formed by the liquid crystal elements 431a and 431b using the polarized light. In the liquid crystal elements 431a and 431b of the first projection module 11a and the second projection module 11b, the polarizing plate on the incident side can be omitted, efficiency of utilization of light can be increased, and reduction in cost can be achieved.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

For example, as described above, while the lighting tool 10, 110, 210 or 310 for a vehicle having two projection modules has been described, the present invention can be applied to a lighting tool for a vehicle having three projection modules or more.

In addition, in the above-mentioned embodiments, the light distribution patterns Xa and Xb have exemplified the case in which the light distribution angles in the upward and downward direction coincide with each other. However, also in the upward and downward direction, like in the leftward and rightward direction, the light distribution angle may be different. In this case, in the upward and downward direction, the complex light distribution patterns X having different illuminance distributions can be formed.

In addition, while the case in which the transmission type liquid crystal element is employed as the liquid crystal elements 31a and 31b has been described in the above-mentioned embodiments, a reflection type liquid crystal element may be employed. In addition, various types of liquid crystal element such as a vertical alignment type (VA type), a TN type, an STN type, and so on, may be used as the liquid crystal element. In addition, even in the driving method of the liquid crystal element, simple matrix driving, active matrix driving using TFT or the like, and so on, may be used.

What is claimed is:

1. A lighting tool for a vehicle comprising:
a light source device;
a lighting tool body configured to be provided on a vehicle body of the vehicle; and
a first projection module and a second projection module that are provided inside the lighting tool body and that are each configured to radiate light radiated from the light source device toward a front of the vehicle as a light distribution pattern,
wherein the light source device radiates light toward each of the first projection module and the second projection module,
the first projection module and the second projection module each include:
a liquid crystal element that modulates the light radiated from the light source device to form an image light; and
a projection optical system that radiates the image light forward as the light distribution pattern, and
at least a part of the light distribution pattern of the first projection module and a part of the light distribution pattern of the second projection module overlap with each other.

2. The lighting tool for a vehicle according to claim 1, wherein
the light distribution pattern of the first projection module and the light distribution pattern of the second projection module overlap with each other while respective projection range are deviated from one another in a direction of a first axis.

3. The lighting tool for a vehicle according to claim 1, wherein
a projection range of the light distribution pattern of the first projection module in a direction of a first axis includes a projection range of the light distribution pattern of the second projection module in the direction of the first axis.

4. The lighting tool for a vehicle according to claim 1, wherein
a projection range of the light distribution pattern of the first projection module in a horizontal direction includes a projection range of the light distribution pattern of the second projection module in the horizontal direction.

5. The lighting tool for a vehicle according to claim 1, wherein the light source device includes:
a light source main body; and
a polarization beam splitter that reflects light radiated from the light source main body as first polarized light, and that allows the light to pass therethrough as second polarized light having a polarization direction perpendicular to that of the first polarized light,
the first projection module modulates the first polarized light reflected by the polarization beam splitter in the liquid crystal element as the image light and radiates the image light forward as the light distribution pattern in the projection optical system, and
the second projection module modulates the second polarized light passing through the polarization beam splitter in the liquid crystal element as the image light and radiates the image light forward as the light distribution pattern in the projection optical system.

6. The lighting tool for a vehicle according to claim 1, comprising:
an object detection part that detects an object present in front of the vehicle; and
a controller that controls the liquid crystal element and form the light distribution pattern of the first projection module and the light distribution pattern of the second projection module on the basis of detection circumstances of the object detection part.

7. The lighting tool for a vehicle according to claim 1, wherein
the light distribution pattern of the first projection module and the light distribution pattern of the second projection module overlap with each other over an entire projection range in a direction of a first axis.

* * * * *